(12) United States Patent
Lan et al.

(10) Patent No.: US 9,369,452 B1
(45) Date of Patent: *Jun. 14, 2016

(54) SYSTEM AND METHOD FOR SECURE MESSAGE REPLY

(71) Applicant: CITICORP CREDIT SERVICES, INC. (USA), Long Island City, NY (US)

(72) Inventors: Sikun Lan, Los Angeles, CA (US);
Yong K. Huang, Los Angeles, CA (US);
Kent Frazier, Los Angeles, CA (US);
Roy Sykes, Redondo Beach, CA (US);
Joseph Zusman, Sherman Oaks, CA (US)

(73) Assignee: Citicorp Credit Services, Inc. (USA), Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,258

(22) Filed: Jun. 13, 2014

Related U.S. Application Data

(63) Continuation of application No. 12/896,457, filed on Oct. 1, 2010, now Pat. No. 8,756,676, which is a continuation of application No. 10/777,129, filed on Feb. 13, 2004, now Pat. No. 7,827,603.

(51) Int. Cl.
*H04L 29/06* (2006.01)
(52) U.S. Cl.
CPC ...................................... *H04L 63/08* (2013.01)
(58) Field of Classification Search
CPC .................................................... H04L 63/08
USPC .............. 726/14, 4, 6, 7, 27, 22, 28; 713/155, 713/170, 189, 176
See application file for complete search history.

(56) References Cited

U.S. PATENT DOCUMENTS

| | | | |
|---|---|---|---|
| 5,754,938 A | 5/1998 | Herz et al. | 725/116 |
| 5,754,939 A | 5/1998 | Herz et al. | 455/3.04 |
| 5,812,670 A * | 9/1998 | Micali | G06Q 20/0855 380/30 |
| 5,878,403 A | 3/1999 | DeFrancesco et al. | 705/38 |
| 5,890,140 A | 3/1999 | Clark et al. | 705/35 |
| 5,991,414 A | 11/1999 | Garay et al. | 713/165 |
| 5,995,947 A | 11/1999 | Fraser et al. | 705/38 |
| 6,023,510 A * | 2/2000 | Epstein | G06Q 20/383 380/285 |
| 6,035,402 A | 3/2000 | Vaeth et al. | 726/2 |
| 6,108,644 A | 8/2000 | Goldschlag et al. | 705/69 |
| 6,158,044 A | 12/2000 | Tibbetts | 717/100 |
| 6,161,185 A * | 12/2000 | Guthrie | G06F 21/31 707/999.002 |
| 6,192,472 B1 | 2/2001 | Garay et al. | 713/165 |
| 6,208,973 B1 | 3/2001 | Boyer et al. | 705/2 |
| 6,209,100 B1 * | 3/2001 | Robertson | G06Q 10/10 705/74 |
| 6,233,565 B1 | 5/2001 | Lewis et al. | 705/35 |
| 6,308,277 B1 | 10/2001 | Vaeth et al. | 726/10 |

(Continued)

*Primary Examiner* — David Garcia Cervetti
(74) *Attorney, Agent, or Firm* — Eric L. Sophir; Dentons US LLP

(57) ABSTRACT

A system and method whereby an unregistered, anonymous user at an organization's website makes a submission/inquiry and is able to access a secure response containing private information without pre-registering or establishing an account with the organization. A response to the user is made via an unsecured e-mail notification that provides the user with an HTTPS link to an authentication page. The user then enters his/her user identification, for example, the user email address and password which was associated with the original submission/inquiry. Once the email address and password is authenticated, the secure response message is displayed on the user's web browser in SSL. Each response is provided on a per-submission basis.

21 Claims, 2 Drawing Sheets

(56) References Cited

U.S. PATENT DOCUMENTS

| | | | | |
|---|---|---|---|---|
| 6,363,365 | B1 | 3/2002 | Kou | 705/64 |
| 6,385,594 | B1 | 5/2002 | Lebda et al. | 705/38 |
| 6,385,614 | B1 | 5/2002 | Vellandi | |
| 6,438,583 | B1 | 8/2002 | McDowell et al. | 709/206 |
| 6,442,687 | B1* | 8/2002 | Savage | H04L 63/0407 709/203 |
| 6,446,206 | B1 | 9/2002 | Feldbaum | 713/175 |
| 6,584,564 | B2* | 6/2003 | Olkin | H04L 12/5875 713/151 |
| 6,587,841 | B1 | 7/2003 | DeFrancesco et al. | 705/38 |
| 6,608,888 | B2* | 8/2003 | Bedingfield | H04L 12/585 379/201.11 |
| 6,611,816 | B2 | 8/2003 | Lebda et al. | 705/38 |
| 6,622,131 | B1 | 9/2003 | Brown et al. | 705/38 |
| 6,654,724 | B1 | 11/2003 | Rubin et al. | 705/3 |
| 6,704,716 | B1* | 3/2004 | Force | G06Q 30/08 705/26.3 |
| 6,807,530 | B1* | 10/2004 | Shub | G06Q 20/12 705/26.42 |
| 6,834,796 | B2 | 12/2004 | Anvekar et al. | 235/380 |
| 6,839,843 | B1 | 1/2005 | Bacha et al. | 713/176 |
| 6,851,049 | B1* | 2/2005 | Price, III | G06Q 20/383 380/282 |
| 6,892,222 | B2 | 5/2005 | McDowell et al. | 709/206 |
| 6,904,412 | B1 | 6/2005 | Broadbent et al. | 705/38 |
| 6,920,463 | B2 | 7/2005 | Kishimoto | |
| 6,938,022 | B1 | 8/2005 | Singhal | 705/74 |
| 6,941,285 | B2 | 9/2005 | Sarcanin | 705/67 |
| 6,952,769 | B1* | 10/2005 | Dubey | H04L 63/0407 713/153 |
| 6,981,222 | B2 | 12/2005 | Rush et al. | 715/738 |
| 6,985,886 | B1 | 1/2006 | Broadbent et al. | 705/38 |
| 6,989,732 | B2 | 1/2006 | Fisher | 340/3.1 |
| 6,990,189 | B2 | 1/2006 | Ljubicich | 379/218.01 |
| 7,003,661 | B2 | 2/2006 | Beattie et al. | 713/156 |
| 7,003,799 | B2 | 2/2006 | Jorgenson | 726/2 |
| 7,010,512 | B1 | 3/2006 | Gillin et al. | 705/39 |
| 7,010,572 | B1 | 3/2006 | Benjamin et al. | 709/206 |
| 7,047,532 | B1 | 5/2006 | Connelly | 719/310 |
| 7,069,234 | B1 | 6/2006 | Cornelius et al. | 705/26 |
| 7,107,246 | B2* | 9/2006 | Wang | G06F 21/35 380/282 |
| 7,120,929 | B2 | 10/2006 | Beattie et al. | 726/6 |
| 7,143,058 | B2* | 11/2006 | Sugimoto | G06Q 30/02 705/26.81 |
| 7,152,045 | B2 | 12/2006 | Hoffman | 705/43 |
| 7,181,427 | B1 | 2/2007 | DeFrancesco et al. | 705/38 |
| 7,200,578 | B2 | 4/2007 | Paltenghe et al. | 705/74 |
| 7,213,032 | B2 | 5/2007 | Mascarenhas | 705/10 |
| 7,222,156 | B2* | 5/2007 | Gupta | G06F 17/241 709/206 |
| 7,236,957 | B2 | 6/2007 | Crosson Smith | 705/50 |
| 7,242,946 | B2* | 7/2007 | Kokkonen | H04L 63/101 455/456.1 |
| 7,272,716 | B2* | 9/2007 | Haller | G06Q 10/087 380/270 |
| 7,277,549 | B2* | 10/2007 | Olkin | H04L 12/5875 380/277 |
| 7,280,819 | B2 | 10/2007 | Engelhart | 455/411 |
| 7,305,436 | B2* | 12/2007 | Willis | G06F 17/30702 707/999.007 |
| 7,325,127 | B2* | 1/2008 | Olkin | H04L 12/5875 713/152 |
| 7,334,025 | B2 | 2/2008 | Kuriya | 709/203 |
| 7,334,184 | B1 | 2/2008 | Simons | 715/234 |
| 7,349,871 | B2 | 3/2008 | Labour et al. | 705/26 |
| 7,356,481 | B2* | 4/2008 | Mitsuoka | G06Q 10/0631 705/7.12 |
| 7,404,086 | B2 | 7/2008 | Sands et al. | 726/5 |
| 7,418,256 | B2 | 8/2008 | Kall et al. | 455/411 |
| 7,418,437 | B1* | 8/2008 | Marks | G06Q 10/10 |
| 7,421,476 | B2* | 9/2008 | Weaver | G06Q 10/10 707/999.002 |
| 7,428,495 | B2 | 9/2008 | Dhar et al. | 705/8 |
| 7,458,079 | B2 | 11/2008 | Connelly | 719/313 |
| 7,472,071 | B2* | 12/2008 | Marks | G06Q 10/06311 705/4 |
| 7,533,141 | B2 | 5/2009 | Nadgir et al. | 709/200 |
| 7,555,459 | B2 | 6/2009 | Dhar et al. | 705/38 |
| 7,606,760 | B2 | 10/2009 | Hutchison et al. | 705/40 |
| 7,610,339 | B2* | 10/2009 | Evans | H04L 63/083 709/206 |
| 7,640,204 | B2* | 12/2009 | Florance | G06Q 10/087 705/1.1 |
| 7,653,679 | B2* | 1/2010 | Kantor | G06F 9/546 709/201 |
| 7,720,910 | B2* | 5/2010 | Goodman | G06Q 10/107 370/352 |
| 7,827,603 | B1* | 11/2010 | Lan | H04L 63/083 713/155 |
| 7,844,717 | B2 | 11/2010 | Herz et al. | |
| 7,886,008 | B2 | 2/2011 | Tomkow et al. | 709/206 |
| 7,930,252 | B2* | 4/2011 | Bender | G06F 21/6254 705/50 |
| 7,941,488 | B2 | 5/2011 | Goodman | G06Q 10/107 370/352 |
| 7,954,112 | B2 | 5/2011 | Yakushev et al. | 709/206 |
| 8,001,014 | B2* | 8/2011 | Sonderegger | G06Q 30/06 705/26.1 |
| 2001/0029472 | A1 | 10/2001 | Hataguchi | 705/26 |
| 2001/0029496 | A1* | 10/2001 | Otto | G06Q 20/04 705/74 |
| 2001/0034709 | A1 | 10/2001 | Stoifo et al. | 705/51 |
| 2001/0034723 | A1 | 10/2001 | Subramaniam | 705/74 |
| 2001/0044785 | A1 | 11/2001 | Stoifo et al. | 705/74 |
| 2002/0004900 | A1* | 1/2002 | Patel | G06Q 30/02 713/155 |
| 2002/0019764 | A1* | 2/2002 | Mascarenhas | G06Q 30/02 707/792 |
| 2002/0032602 | A1* | 3/2002 | Lanzillo, Jr. | G06Q 30/02 705/14.66 |
| 2002/0040312 | A1 | 4/2002 | Dhar et al. | 705/8 |
| 2002/0040339 | A1 | 4/2002 | Dhar et al. | 705/38 |
| 2002/0049642 | A1 | 4/2002 | Moderegger et al. | 705/26 |
| 2002/0053021 | A1 | 5/2002 | Rice et al. | 713/155 |
| 2002/0054170 | A1 | 5/2002 | Rush et al. | 715/854 |
| 2002/0059137 | A1 | 5/2002 | Freeman et al. | 705/38 |
| 2002/0059532 | A1* | 5/2002 | Ata | B60R 25/20 726/28 |
| 2002/0062342 | A1 | 5/2002 | Sidles | 709/203 |
| 2002/0069139 | A1 | 6/2002 | Bernstein et al. | 705/27 |
| 2002/0072975 | A1 | 6/2002 | Steele et al. | 705/14.1 |
| 2002/0087483 | A1 | 7/2002 | Harif | 705/76 |
| 2002/0099775 | A1* | 7/2002 | Gupta | G06Q 10/107 709/205 |
| 2002/0099824 | A1* | 7/2002 | Bender | G06F 21/6254 709/225 |
| 2002/0103562 | A1 | 8/2002 | Kishimoto | 700/117 |
| 2002/0103689 | A1* | 8/2002 | Hornick | G06Q 10/103 705/26.1 |
| 2002/0107804 | A1 | 8/2002 | Kravitz | 705/51 |
| 2002/0111835 | A1 | 8/2002 | Hele et al. | 705/4 |
| 2002/0116231 | A1* | 8/2002 | Hele | G06Q 10/10 705/4 |
| 2002/0164004 | A1* | 11/2002 | Tamura | G06Q 30/02 379/93.12 |
| 2002/0165815 | A1* | 11/2002 | Vincent | G06Q 30/0601 705/37 |
| 2002/0165948 | A1 | 11/2002 | Vincent | 709/223 |
| 2002/0190123 | A1* | 12/2002 | Anvekar | G06Q 20/385 235/380 |
| 2002/0194501 | A1* | 12/2002 | Wenocur | G06Q 10/107 726/4 |
| 2003/0014631 | A1 | 1/2003 | Sprague | 713/168 |
| 2003/0037232 | A1 | 2/2003 | Bailiff | 713/153 |
| 2003/0069803 | A1 | 4/2003 | Pollitt | G06Q 30/0601 705/26.1 |
| 2003/0083986 | A1 | 5/2003 | Kobayashi | 705/39 |
| 2003/0115272 | A1* | 6/2003 | Muttitt | G06Q 30/02 709/206 |
| 2003/0120608 | A1 | 6/2003 | Pereyra | 705/64 |
| 2003/0158960 | A1* | 8/2003 | Engberg | G06Q 20/02 709/237 |

(56) References Cited

U.S. PATENT DOCUMENTS

| | | | |
|---|---|---|---|
| 2003/0163413 A1* | 8/2003 | Wiczkowski | G06Q 20/00 705/38 |
| 2003/0163416 A1 | 8/2003 | Kitajima | 705/39 |
| 2003/0179870 A1* | 9/2003 | deSa | G06Q 30/02 379/93.12 |
| 2003/0190046 A1* | 10/2003 | Kamerman | H04L 9/006 380/286 |
| 2003/0220867 A1 | 11/2003 | Goodwin et al. | 705/37 |
| 2004/0078475 A1* | 4/2004 | Camenisch | G06F 21/10 709/229 |
| 2004/0148356 A1* | 7/2004 | Bishop, Jr. | H04L 51/38 709/206 |
| 2004/0162056 A1* | 8/2004 | Engelhart | G06Q 30/02 455/411 |
| 2004/0176995 A1 | 9/2004 | Fusz | 705/10 |
| 2004/0190707 A1* | 9/2004 | Ljubicich | H04M 3/42008 379/218.01 |
| 2004/0230566 A1* | 11/2004 | Balijepalli | G06F 17/30864 |
| 2005/0010507 A1 | 1/2005 | Straub | 705/35 |
| 2005/0015506 A1* | 1/2005 | Padborg | G06Q 10/107 709/229 |
| 2005/0027617 A1 | 2/2005 | Zucker et al. | 705/26 |
| 2005/0027618 A1 | 2/2005 | Zucker et al. | 705/26 |
| 2005/0033659 A1 | 2/2005 | Zucker et al. | 705/26 |
| 2005/0076089 A1 | 4/2005 | Fonseca | 709/206 |
| 2005/0114218 A1 | 5/2005 | Zucker et al. | 705/18 |
| 2005/0177495 A1 | 8/2005 | Crosson Smith | 705/39 |
| 2005/0177504 A1 | 8/2005 | Crosson Smith | 705/40 |
| 2005/0187856 A1 | 8/2005 | Rabenold et al. | 705/37 |
| 2005/0240490 A1 | 10/2005 | Mackey | 705/26 |
| 2006/0183463 A1 | 8/2006 | Falk et al. | 455/411 |
| 2007/0061230 A1* | 3/2007 | Kim-E | G06Q 40/00 705/35 |

* cited by examiner

SYSTEM AND METHOD FOR SECURE MESSAGE REPLY

CROSS-REFERENCE TO RELATED APPLICATIONS

This application is a continuation of U.S. patent application Ser. No. 12/896,457, filed Oct. 1, 2010, which issued as U.S. Pat. No. 8,756,676 on Jun. 17, 2014, entitled "System and Method for Secure Message Reply," which is a continuation of U.S. patent application Ser. No. 10/777,129, filed Feb. 13, 2004, which issued as U.S. Pat. No. 7,827,603 on Nov. 2, 2010, which is entitled "System and Method for Secure Message Reply," all of which are hereby incorporated by reference in their entirety.

FIELD OF THE INVENTION

The present invention relates to a system and method for securely providing a reply via the Internet in response to an online submission made by an unregistered user. More particularly, but not by way of limitation, the present invention is a system and method for securely providing a reply containing private information to a prospect who has submitted an online submission and/or inquiry via a website without having the prospect first pre-register or establish an account.

BACKGROUND OF THE INVENTION

There is a need by organizations, such as businesses, to provide secure responses not only to an established customer, but also to an unregistered user or prospect. The prospect includes, for example, a unauthenticated visitor at a website who does not have an account with the organization associated with the website. The term "account" is not intended to be limiting and can apply to any type of record or documentation on the user, including, for example, in the context of a banking website, a credit card account, checking account, etc.

Although the capability to securely accept communications via the Internet may exist, there is not an effective and efficient way to reply to an unregistered prospect via the Internet in a secure form so that the prospect may remain anonymous. Therefore, private and/or confidential information is not included in replies to unregistered prospects via the Internet. Secure replies are limited to those registered users who have been authenticated and have an established account. Further, there is not an efficient and cost-effective way to incorporate existing infrastructure to provide the secure replies to the unregistered users.

Accordingly, there is a need for a system and method for securely providing a reply via the Internet in response to an online submission made by an unregistered user or prospect.

SUMMARY OF THE INVENTION

An embodiment of the present invention is a system and method whereby an unregistered user or prospect may go to an organization's website with a submission or inquiry, and receive a secure response from the organization without establishing an account with the organization. There is no requirement for the prospect to "log on." The submission may be, for example, a loan application made to a financial services institution. The loan application by the unregistered prospect may contain private information about the prospect which he/she sends via a secure website. The response from a customer service representative at the financial services institution is also provided in a secure manner via the Internet, although the prospect did not pre-register and remains anonymous. The response may include the prospect's private information that was in the original submission, such as, an account number, a balance, or other additional private information. Although reference is made to the Internet, other communication systems are also within the scope of the invention.

An embodiment of the present invention provides that the prospect enter a prospect-created password as part of the original submission. In a further embodiment, the password is required to satisfy certain security requirements in terms of length and character combinations so that it cannot be easily guessed by another person. A secure relationship is created on a per-submission basis. For each submission he/she sends via the website, the prospect can use a different password (a different identification). The prospect is able to retrieve a return message in a secure manner because he/she is the only one who knows what was entered as the password. The prospect remains anonymous in the transaction to protect his/her privacy. Other embodiments include providing a user name along with a password, wherein the user name is the email address of the prospect. A different email address may also be provided by the prospect as the user name. Other embodiments involve passwords and/or other types of identifiers that have been provided to the prospect.

An embodiment of the present invention comprises the following steps: A user at a personal computer, kiosk, etc. enters a website, for example a website of a mortgage lender, and completes a "contact us" form wherein the user identifies himself/herself and provides specific information. The user provides a shared password for that particular communication. In this embodiment, the information is sent to an Internet Email Workflow Application (IEWA). A customer service representative, after verifying the user and the required data, prepares a reply to the user. A copy of the reply is placed in the web server. The reply may be made available for only a specified period of time, for example, 30 days. A notification email is sent (e.g., Simple Mail Transfer Protocol) to the user to securely retrieve the reply without any additional information. The notification, for example, takes the form of providing the user with a hyperlink of a Uniform Resource Locator in the notification email and an authentication screen is displayed whereby the user is asked for his/her identification and a password. Once authenticated, the secure reply is presented to the user.

Although examples of certain types of online forms have been identified, these examples are not meant to be limiting. There are countless varieties of online forms that may be used, such as, online forms pertaining to credit cards, loans, change of addresses, registration, identification, resumes, surveys, technical problems, etc.

As discussed, an embodiment of the present invention provides for a secure dialogue on a per submission/inquiry basis. The same prospect may complete a second online form and provide a different email address as an identifier and a different password. There is no need for the prospect to register or establish a universal account. A level of anonymity is therefore maintained and privacy is enhanced. Further, the person accessing the website need not be a first-time prospect but may be an existing customer, and the submission need not be an online form but can be any type of submission pertaining to a variety of matters.

A further embodiment of the invention is a method for providing a secure response to a first party, comprising the steps of: receiving a submission from the first party over a communications network, wherein the submission is directed to a second party and includes an identifier associated with the submission, and wherein the first party has not established a relationship with the second party. The steps further include receiving a response to the submission from the second party, storing the response for later retrieval by the first party or the second party, and sending a notification to the first party wherein the notification provides information for securely accessing the response. The steps also include receiving a second submission from the first party wherein the second submission comprises information for correlation to the identifier provided in the first submission, authenticating the first party, and permitting the first party to securely access the response from the second party.

DETAILED DESCRIPTION

Reference will now be made in detail to embodiments of the invention, one or more examples of which are illustrated in the accompanying drawing. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In an embodiment of the present invention, communication is submitted by a user visiting a web site. The communication may be, for example, forms-based, meaning a form with a preset design, such as an online application form or customer service communication form. The embodiment further comprises a secure e-mail messaging system, such as, an Internet Email Workflow Application (IEWA) that supports two way messaging and allows a business to receive and process customer communications sent via the web site. Communication from the Internet user is secured using, for example, SSL with 128-bit encryption.

Once a response has been prepared to the user's submission, communication to the user is made via an unsecured e-mail notification that provides the user with an HTTPS link to an authentication page. The user then enters his/her user identification, for example, the user's email address and password which was associated with the original submission. Once the email address and password are authenticated, the secure response message is displayed on the user's web browser in SSL.

Figure 1:
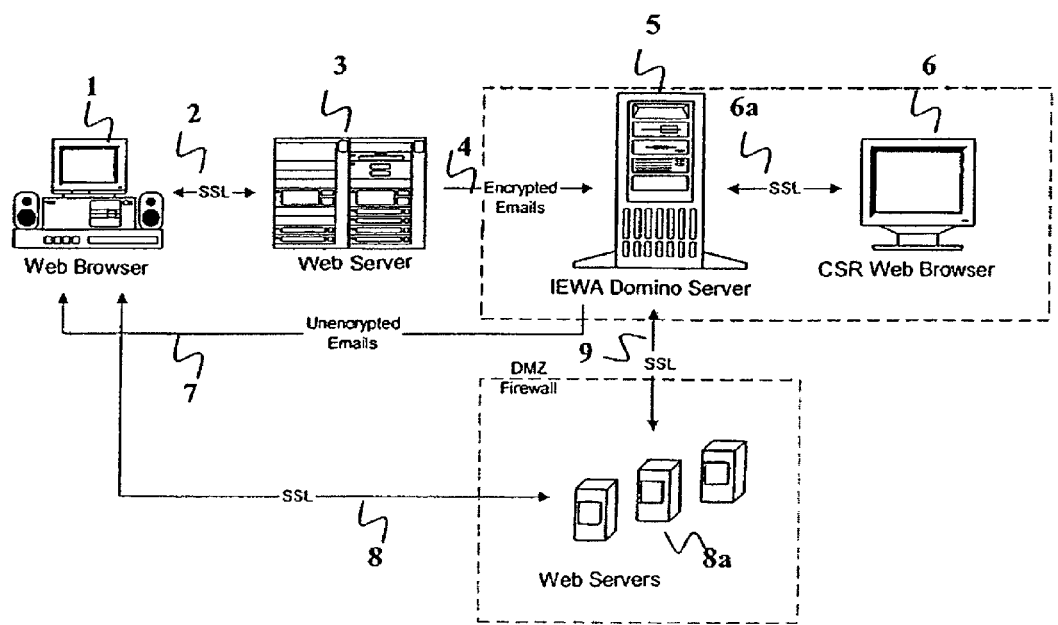
FIG. 1 is a system architecture diagram of an embodiment of the invention.

Referring now to FIG. 1, the user (customer, prospect, etc.) through his/her web browser 1 visits a web site and provides a submission, for example, by filling in and submitting an online loan application form, using a secure connection (SSL) 2. The web server 3 hosting the web site converts the form into an email message, then encrypts the message 4, for example, using Entrust, and sends it, for example, to the IEWA Domino Server 5. If a password is included in the user's submission, and a customer service representative (CSR) 6 chooses to send a secure response 6a to the user, the following process takes place in accordance with an embodiment of the invention.

IEWA saves the secure response in the secure response database residing on the same Domino server 5 as the workflow database. Also, the secure response message is saved in the history section of the original message. A notification message 7, configurable by workflow administrators, is sent to the user's email address with instructions on how to access the secure response via a web browser in SSL connection. If the above notification message 7 is bounced, IEWA locates the original message in the workflow database and marks the message status as bounced.

When the user attempts to retrieve 8, 8a the secure response in a SSL session using the link provided in the notification message, he or she is prompted to enter the email address and password that was provided in his or her initial request message. The page will make HTTPS connections 9 to the IEWA Domino Server for the secure response content. If the email address and password combination is correct, the response message will be displayed on the user's web browser in SSL. Otherwise, the user will be asked to reenter the email address and the password. If the user fails to provide the correct combination for, for example, six consecutive times, the secure response will be disabled/locked from the secure response database. Time and status of the user's attempts to retrieve the secure response is recorded in the history section of the original message. Regardless of user success or failure to retrieve the response message, the secure response is disabled/locked in the secure response database after, for example, seven days. IEWA removes the disabled/locked secure response from the secure response database after a specified number of days.

Figure 2:
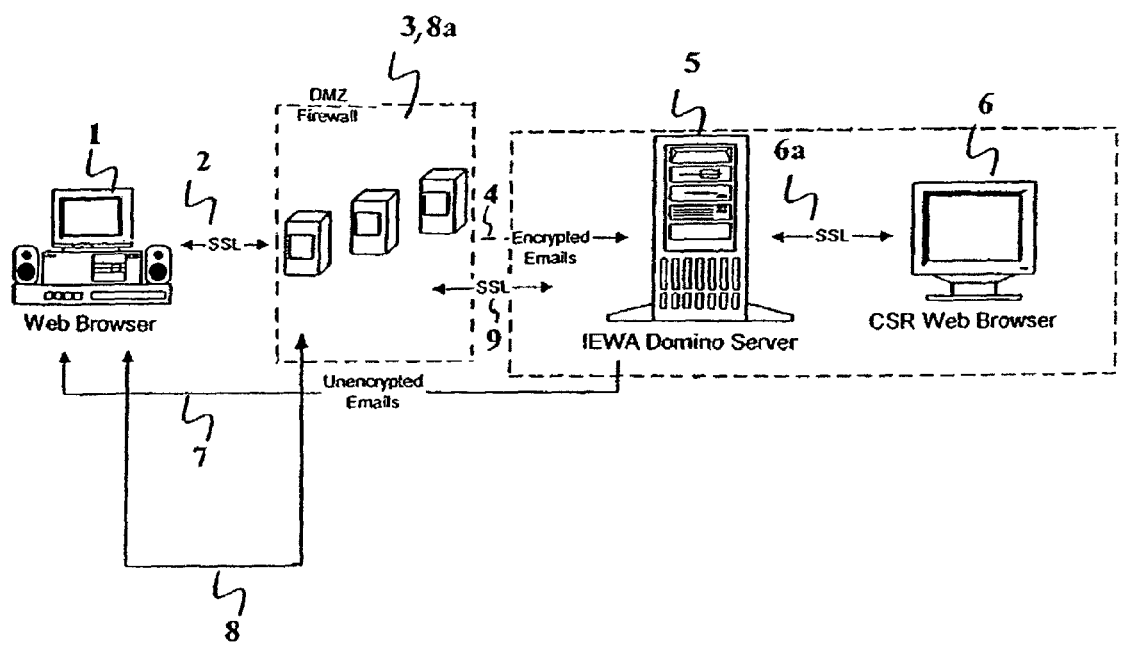
FIG. 2 is a system architecture diagram of an alternative embodiment of the invention.

FIG. 2 is an alternate embodiment of the invention and illustrates that the system architecture need not involve separate web servers as depicted by the embodiment in FIG. 1.

Embodiments of the present invention have now been described in fulfillment of the above objects. It will be appreciated that these examples are merely illustrative of the invention. Many variations and modifications will be apparent to those skilled in the art. Although examples have been provided in the context of private information related to financial matters, the invention is not limited as such and is also applicable to private information related to, for example, health and other personal matters.

The invention claimed is:

1. A method for providing a secure response to a first party, the method comprising:

presenting, by a computer, an application to an unauthenticated user;

receiving, by the computer, an application response by the unauthenticated user including private information of the unauthenticated user but not including identification information of the unauthenticated user;

encrypting, by the computer, the application response including the private information;

receiving, by the computer, the encrypted application response;

generating, by the computer, a response to the application response;

transmitting, by the computer, instructions to the unauthenticated user to access the response;

receiving, by the computer, identification information of the unauthenticated user;

authenticating, by the computer, the unauthenticated user based on the identification information, whereby the unauthenticated user is an authenticated user; and presenting, by the computer, the response to the application response to the authenticated user.

2. The method according to claim 1, further comprising:
sending, by the computer, a message to the authenticated user comprising instructions for accessing the response using a web browser.

3. The method according to claim 1, further comprising converting, by the computer, the application response by the unauthenticated user into an email message.

4. A method for providing a secure response to an unauthenticated applicant, comprising:
receiving, by a computer, a first application submission from the unauthenticated applicant and a response thereto by a financial institution, wherein the first application submission is directed to the financial institution and includes an identifier associated with the first application submission, and wherein the unauthenticated applicant is not authenticated or registered with the financial institution when the first application submission is received;
storing, by the computer, the response by the financial institution for later retrieval by an unauthenticated first party or the financial institution;
sending, by the computer, a notification message to the unauthenticated applicant, wherein the notification message provides information for securely accessing the response; and
correlating, by the computer, a second submission from the unauthenticated first party to the identifier provided in the first application submission and permitting the applicant to securely access the response from the financial institution upon authentication of the unauthenticated applicant,
wherein the unauthenticated first party cannot access the stored response until the unauthenticated first party is authenticated via the notification to the unauthenticated applicant.

5. A system for providing a secure response to an unauthenticated first party, comprising:
a receiving component, executed by a server, for receiving a first submission from the unauthenticated first party and a response thereto by a second party, wherein the first submission is directed to the second party and includes an identifier associated with the first submission, and wherein the unauthenticated first party is not authenticated or registered with the second party when the first submission is received;
a data storage medium for storing the response by the second party for later retrieval by the unauthenticated first party or the second party;
a transmitting component, executed by the server, for sending a notification to the unauthenticated first party, wherein the notification provides information for securely accessing the response; and
an authentication component, executed by the server, for permitting the unauthenticated first party to securely access the response from the second party upon authentication of the unauthenticated first party,
wherein the unauthenticated first party cannot access the stored response until the unauthenticated first party is authenticated via the notification to the unauthenticated first party.

6. The system of claim 5, wherein the submission by the unauthenticated first party is made from a client system via a communications network.

7. The system of claim 5, wherein the identifier is a password.

8. The system of claim 5, wherein the identifier comprises a user name or an email address.

9. The system of claim 5, wherein the unauthenticated first party is an unregistered prospect.

10. The system of claim 5, wherein the unauthenticated first party pre-registered with the second party prior to the submission by the unauthenticated first party.

11. The system of claim 5, wherein the submission from the unauthenticated first party is forms-based.

12. The system of claim 5, wherein the submission from the unauthenticated first party contains private information about the unauthenticated first party.

13. The system of claim 5, wherein the submission from the unauthenticated first party is received through a secure system.

14. The system of claim 5, wherein the second party includes a customer service representative.

15. The system of claim 5, wherein the response to the submission contains private information about the unauthenticated first party.

16. The system of claim 5, wherein the notification is an unsecured email notification.

17. The system of claim 5, wherein if the notification is bounced, the first submission is located and marked to indicate that the notification was bounced.

18. The system of claim 5, wherein the information for securely accessing the response comprises a secure Hypertext Transfer Protocol link to an authentication page.

19. The system of claim 5, further comprising:
a processing component, executed by the server, for recording the attempts to access the response.

20. The system of claim 5, further comprising:
a security component for preventing access to the response after a predetermined time period.

21. The system of claim 5, further comprising:
a security component for preventing access to the response after a predetermined number of failed attempts.

* * * * *